United States Patent [19]
Brainin

[11] 3,797,113
[45] Mar. 19, 1974

[54] DENTAL IMPLANT
[75] Inventor: Herbert Brainin, Los Angeles, Calif.
[73] Assignee: Vitredent Corporation, Los Angeles, Calif.
[22] Filed: Feb. 24, 1972
[21] Appl. No.: 228,843

Related U.S. Application Data
[63] Continuation-in-part of Ser. No. 42,069, June 1, 1970, Pat. No. 3,717,932.

[52] U.S. Cl............................................. 32/10 A
[51] Int. Cl........................................... A61c 13/00
[58] Field of Search.................................. 32/10 A

[56] References Cited
UNITED STATES PATENTS
2,210,424   8/1940   Morrison ............................ 32/10 A Primary Examiner—Robert Peshock
Attorney, Agent, or Firm—Kane, Dalsimer, Kane, Sullivan and Kurucz

[57] ABSTRACT

A dental implant member formed of substantially non-porous, isotropic carbon having a textured and dentated lower portion. The implant member is provided with means for attaching an a artificial crown section thereto.

7 Claims, 5 Drawing Figures

PATENTED MAR 19 1974  3,797,113
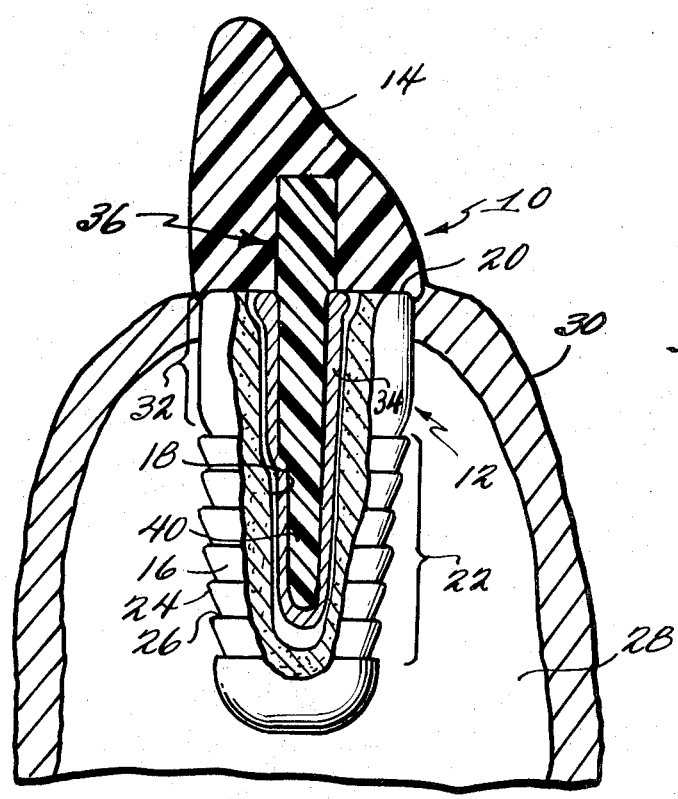
Fig. 1
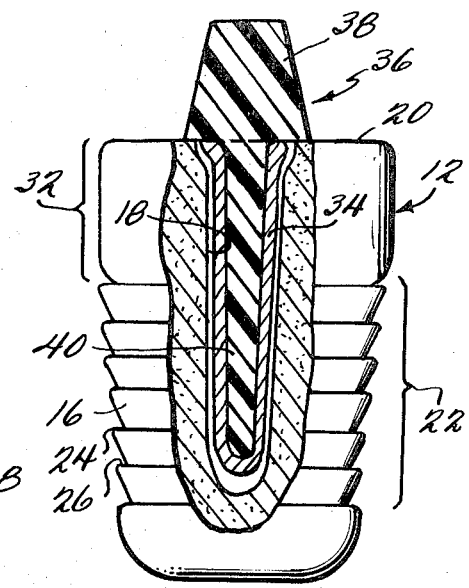
Fig. 2
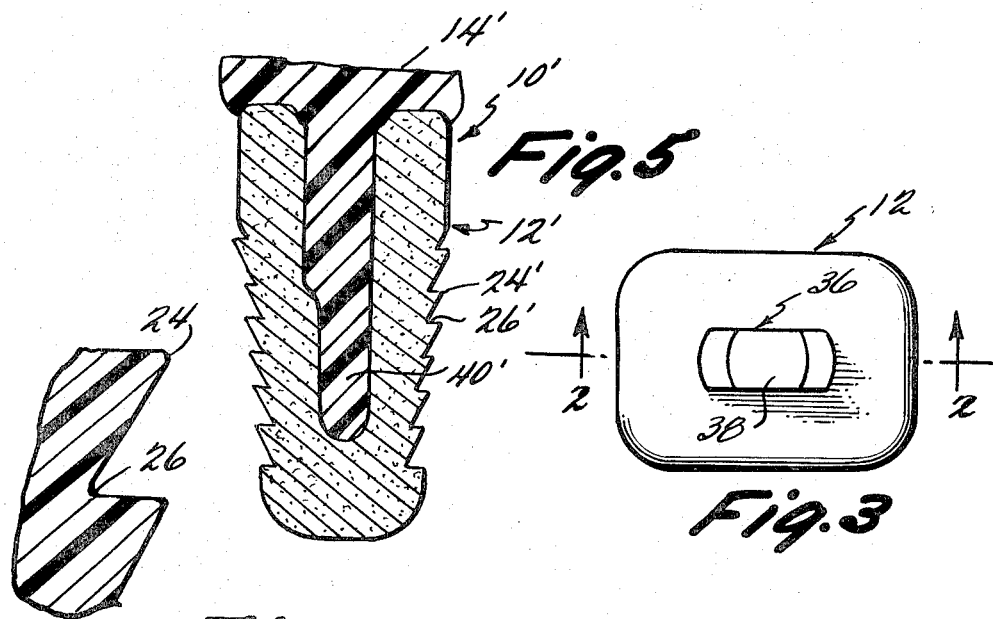
Fig. 5
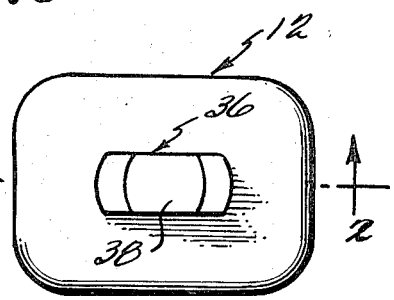
Fig. 3
Fig. 4

DENTAL IMPLANT

This application is a continuation-in-part of U.S. Pat. application Ser. No. 42,069, filed June 1, 1970, now U.S. Pat. No. 3,717,932, issued Feb. 27, 1973.

The present invention relates to dental implants, and more particularly to a dental implant for insertion into the alveolus of the jaw of a vertebrate to form the root section of an artificial tooth assembly.

BACKGROUND OF THE INVENTION

It is known to form whole tooth implants from metallic substances, such as stainless steel, platinum, tantalum, vitallium, as well as from non-metallic substances, such as methyl methacrylate resins or copolymers of methyl methacrylate with methyl acrylate or ethyl acrylate. It is also known to make implants from such acrylic resins in admixture with approximately 20 percent grated organic calves' bone and these implants have had some success. In use, a regular periodontal membrane forms about the polymer implant between it and the alveolus into which it is fitted. Such implants have disadvantages due to brittleness, lack of strength and cost of such resins. Additionally, prior art implants have suffered from a lack of receptivity by the vertebrate.

OBJECTS OF THE INVENTION

An object of the present invention is to provide a novel tooth implant.

Another object of the invention is to provide an artificial tooth assembly of improved strength.

Still another object of the invention is to prevent rejection of a tooth implant by the receiving vertebrate.

A further object of the invention is to provide a self-immobilizing tooth implant.

A further object of the invention is to provide an artificial tooth implant having a textured surface to which surrounding hard and soft tissue grows forming a bacterial seal there between to prevent invagination.

A still further object of the invention is to provide a tooth implant which inhibits high stress build-up in the implant or alveolar bone after immobilization.

SUMMARY OF THE INVENTION

These and other objects of the invention are obtained by a tooth implant having a dentated or serrated lower surface portion formed of substantially non-porous, isotropic carbon. The porosity of such carbonaceous material is less than 5.0 percent, generally less than 1.0 percent, and preferably less than 0.05 percent.

Such isotropic carbon is microcrystalline in structure and is substantially impermeable. Additionally, the isotropic carbon is chemically, biologically and physically compatible with animal tissue, nontoxic, noncarcinogenic and has been found ideally suited for use as a dental implant material, i.e., as a root section of an artifical tooth. The solid isotropic, chemically resistant carbon employed in the present invention, is well known per se, and may be formed by the thermal degradation of organic materials. One process for producing such impermeable carbonaceous material is described in Redfern U.S. Pat. No. 3,109,712 and British Pat. No. 956,452. The entire disclosure of these patents is hereby incorporated by reference. Such isotropic carbon in bulk form has a density of approximately 1.5, exhibits a conchoidal fracture and is non-porous.

In one form of the invention, the implant is provided with a keyed aperture into which a pin having a crown section mounted thereon is positioned therein. Generally, the implant root section is first inserted into the alveolus of a jaw of a vertebrate, e.g. humans, dogs, cats, etc. to form the root portion of an artificial tooth assembly and the crown section subsequently affixed thereto. the crown section can be of any conventional material, e.g., an acrylic resin such as polymethyl methacrylate, methyl methacrylate copolymerized with methyl acrylate, ethyl acrylate, butyl acrylate, ethylene glycol dimethacrylate (ethylene dimethacrylate), vinyl-acrylic copolymer, nylon, gold polystyrene, etc. or porcelain.

The portion of the implant which is inserted into the alveolus of the vertebrate is provided, at least in part, with a serrated or dentated surface section which impinges on the alveolar bone to anchor in place the implant thereby eliminating splinting during the healing process or after restoration. The dentated surface section is generally formed of at least two, preferably three or more, ridges having rounded edges, as more fully hereinafter described, to prevent alveolar bone resorption. Additionally, the lower portion of the implant is texturized as more fully hereinafter discussed.

DESCRIPTION OF THE DRAWINGS

A better understanding of the present invention as well as other objects and further features thereof will become apparent upon consideration of the following detailed description thereof, especially when taken in conjunction with the accompanying drawings, wherein like numerals indicate like parts throughout and wherein:

FIG. 1 is a view of a tooth implant assembly of the invention inserted into the alveolus of a vertebrate with a cut-away section illustrating a securing assembly for a crown section therefor.

FIG. 2 is a side elevational view of the assembly with a cut-away section illustrating a security means for a crown section therefor;

FIG. 3 is a plan view of the implant or root section of the assembly without a crown section;

FIG. 4 is an enlarged sectional view of a dentated portion of the implant, and

FIG. 5 is a cross-section side view of another embodiment of the invention wherein the crown section and the security means are formed as an integral part.

In man there are 32 permanent teeth, 16 in each jaw. Each lateral half of each jaw contains two incisors, one canine, two premolars or bicuspids, and three molars. The invention may be used to prepare an artificial tooth replacement for any of such natural teeth.

Referring to FIG. 1, there is diagrammatically illustrated in view of an incisor implant tooth assembly, generally indicated as 10, in position in the alveolus of a vertebrate. The implant assembly is comprised of a root section, generally indicated as 12, and a crown section 14. The implant or root section 12 is formed of substantially nonporous, isotropic carbon, e.g., such as by carbonizing an organic compound as described in any of the aforementioned patents.

Referring additionally now to FIGS. 2 and 3, the implant or root section 12 is comprised of a body 16 having a keyed aperture 18 formed therein and extending into the body 16 from a surface 20 on which crown section 14 is to be positioned. A portion of the body 16 of the implant 12 to be placed in contact with the alveolus is formed, at least in part, with a serrated or dentated surface, generally indicated as 22, comprised of a plurality of ridges 24 and corresponding grooves 26. The ends of the ridges 24 are rounded or contoured, (in the sense that no sharp edge is presented) as more clearly illustrated in FIG. 4, with the grooves 26 between being formed with a curved or contoured surface.

The dentated surface portion 22 greatly increases the surface area between the implant and alveolus as compared to prior art devices. Such an increase in surface area decreases the force per unit at the interface thereof under loading conditions. The flat sections of the ridges 24 provide a substantially horizontal component to the distribution of stress imposed upon the supporting bone in the alveolus, generally indicated as 28, in addition to the substantially vertical stress induced by occulsion. Such horizontal component of stress together with the rounded shape of the ends of the ridges 24 (reduce high build-up of stresses) stimulate the surrounding alveolar bone to cause bone overgrowth thereby locking the implant or root section 12 in the alveolus (See FIG. 1). Accordingly, resorption of alveolar bone is prevented.

The outer surface of the main body to be placed in contact with the alveolus e.g. beginning with the dentated surface portion 22 and ending within the upper surface portion 32 is texturized, such as by sandblasting to provide, inter alia, increased surface area. Such an increase in surface area provides for (a) support; (b) fibrous ingrowth onto the resulting textured surface; and (c) epithelial ingrowth onto the implant thereby yielding gingival attachment. Additionally, the texturizing of the lower portion of the implant prevents an epithelial invagination and subsequent exfoliation. That portion of the implant, generally indicated as 32, above the dentated portion 22, onto which the gingiva portion 30 of the alveolus is to attach, is texturized while the terminal part of surface 32 and surface 20 are smooth so as to minimize plaque adhesion. The size of the resulting surface interstices induced by sandblasting is controlled by the grit size of the sand as well as by the pressure of the air blast. The hardness of isotropic carbon prevents sand particles from becoming imbedded in the surface.

The isotropic carbon being biologically acceptable permits the growth of soft and hard tissue into the surface interstices producing an intricate surface relationship resulting in vast interlocking of tissue thereby aiding implant retention and support. Additionally, since the surface is not smooth, fluids, bacteria and nutrition do not penetrate into the interface, i.e., a bacterial seal is provided. The fibrous tissue grows onto the implant along an axis perpendicular to the implant in a manner analogous to the periodontal membrane of a natural tooth as distinguished from tissue growth about a metallic implant.

In practice, before extraction of a natural tooth, the root size and shape of the tooth are determined by X-ray examination. As soon as the natural tooth is extracted, the root cavity size is confirmed, such as by a feeler gauge and a dental root implant of correct size is selected and inserted into the alveolus and fixed into position by the ridges 24 of the dentated surface 22 of the implant 12. Periodontal ligaments tend to attach to the dental implant with the result that the implant becomes firmly fixed in position within a period of time in the order of from 1 to 6 weeks.

After a reasonable time for healing, the crown section 14 may be positioned on the root section of the implant 12 to form the dental implant assembly or artificial tooth 10. Accordingly, referring to FIGS. 1 and 2, a sleeve 34 is positioned within the keyed aperture 18 and affixed therein, such as by an epoxy cement. Since the amount of the epoxy cement required for a single implant is nominal and would present difficulties to the practitioner, the sleeve 34 is more conveniently cemented in place under factory conditions. A crown section 14 in the shape of the tooth being replaced is formed on the coping portion 38 of a connecting pin member, generally indicated as 36, including a post section 40. The pin 36 is positioned within the sleeve 34 and affixed therein, such as by a dental cement or adhesive, e.g. zinc phosphate, zinc oxide-eugenol, silicate, zinc silicate or acrylic resin (e.g. methyl methacrylate polymer) cements. Consequently, since the sleeve 34 is generally affixed to the implant root 12 during manufacture, the practitioner need only use commercially available dental cements. The sleeve 34 and pin 36 may be formed of any corrosion resistant material having sufficient strength, and are preferably formed of a metal, such as stainless steel, titanium and the like. It is noted, referring to FIGS. 1 and 2, that both the sleeve 34 and the coping 38 of the pin member 36 are shaped to facilitate the positioning of the crown section 14 onto the implant 12 within the jaw of the vertebrate. As illustrated, the pin member 36 can fit within the sleeve 34 in only one orientation, substantially eliminating the problem of alignment as compared to the apparatus and processes of the prior art.

The advantages of the carbon root sections are that they are mechanically stronger than ones made of plastic material and have less tendency to deform by the pressures exerted by the jaws during mastication. The implant or root section of the invention is readily held in position as compared with complete plastic tooth, less expensive to manufacture, with the isotropic carbon specified above being more chemically resistant than plastics.

FIG. 5 illustrates another embodiment of the invention wherein an implant assembly 10' is comprised of a root section 12' and crown section 14'. In this embodiment the implant assembly 10' is produced by externally coating the lower portion of a crown section 14' of another material, for example a ceramic material, with a precursor of substantially non-porous, isotropic carbon. Thereafter the assembly 10' is subjected to elevated temperatures to convert such precursor material to isotropic carbon. It would, of course, be necessary in this instance for the dimensions of the section being coated to be less than the required dimensions for the final root section by an amount equivalent to the desired thickness of the coating of carbonaceous material. Additionally, allowance is made for the reduction or shrinkage of such precursor material during the heat treatment.

While the implant or root section 12 has been discussed as being formed essentially of one part, it is understood that the implant may be formed of a plurality of subsections depending on the size of the alveolus to be treated and the type of tooth being replaced. In other words, the implant could be formed in the general shape of the root section of the tooth being replaced, e.g. three subsections if the tooth being replaced is a molar. For certain applications, a plurality of implants may be inserted into the alveolus of the vertebrate, with a crown section formed on a plurality of connecting pins.

The dentated surface provided on the implant is illustrated as being essentially comprised of a plurality of ridges extending about the implant substantially perpendicular to the axis thereof. In this regard, it is understood that the dentated surface may be comprised of ridges formed at various angles to the axis of the implant, and may even be comprised of V-shaped ridges and grooves.

Additionally, implants may be formed having only a portion of the lower surface dentated, e.g. that portion of the implant which is to be placed in juxtaposition to the alveolar bone upon insertion and upon which alveolar bone overgrowth eventually occurs. Thus, an implant for an incisor tooth would not necessarily require dentated surface on the sides thereof which face adjacent teeth, particularly in a crowded jaw.

Texturizing of all of the surface of the lower section of the implant to be placed in contact with the alveolus is disclosed, however, a portion may only be texturized with like results.

While the instant invention as to its objects and advantages has been described herein as carried in specific embodiments thereof, it is not desired to be limited thereby, but it is intended to cover the invention broadly within the scope of the appended claims.

What is claimed is:

1. A dental implant for insertion into an alveolar cavity in the jaw of a vertebrate to form the root section of an artificial tooth comprising: a member having a shape generally corresponding to said cavity and being capable of being inserted in said cavity and formed, at least in the portion forming the surfaces for engagement with the alveolus, from a carbon material which is chemically, biologically and physically compatible with the hard and soft tissues of the oral cavity of vertebrates, said carbon material being isotropic and microcrystalline in structure and being selected from the group consisting of vitreous, glassy and pyrolytic carbons, said surfaces having a dentated portion comprised of contoured ridges and texturized interstices for enhancing the attachment of hard and soft tissues of the jaw to the root section; and means for facilitating the securing to the member of a crown section forming with said member the artificial tooth.

2. The dental implant as defined in claim 1 wherein the grooves formed between adjacent ridges are contoured.

3. The dental implant as defined in claim 1 wherein said means includes a keyed aperture, and a crown section formed on a pin member which is received by said keyed aperture.

4. The dental implant as defined in claim 3 wherein a keyed sleeve is positioned within the keyed aperture and affixed to said implant.

5. The dental implant as defined in claim 4 wherein the pin member is provided with a keyed post which is received by said sleeve and is affixed to said implant.

6. The dental implant as defined in claim 4 wherein said sleeve is affixed within said keyed aperture of said implant by an adhesive.

7. The dental implant as defined in claim 6 wherein said keyed post is affixed within said sleeve by dental cement.

* * * * *